Aug. 4, 1953     D. B. KEIM     2,647,409
NONSLIP PULLEY DRIVE
Filed June 9, 1948
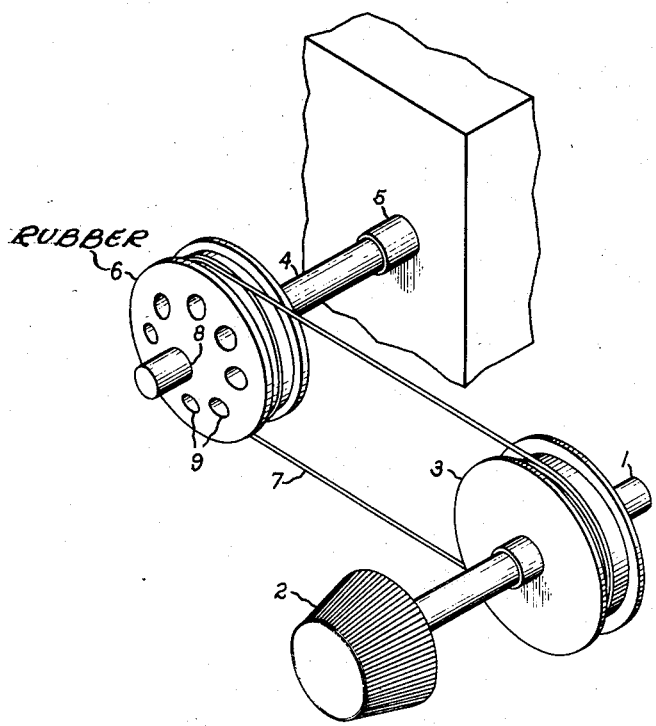
Inventor:
Donald B. Keim,
by *Merton D. Mon*
His Attorney.

Patented Aug. 4, 1953

2,647,409

UNITED STATES PATENT OFFICE 2,647,409

NONSLIP PULLEY DRIVE

Donald B. Keim, Syracuse, N. Y., assignor to General Electric Company, a corporation of New York Application June 9, 1948, Serial No. 31,943

6 Claims. (Cl. 74—219)

My invention relates to pulley driving arrangements and it has for its object to provide an improved arrangement in which slippage between the driving and driven pulley is minimized.

In mechanical driving arrangements where one shaft is desired to follow exactly the rotation of another, such as for example in the tuning drive for a radio receiver, it is customary to employ a pair of pulleys carried, respectively, by a driving and a driven shaft and to use a drive cord which extends between the driving and driven shafts. A tension device customarily is used to maintain the drive cord in tight engagement with pulleys on the shafts and to compensate for stretching of the cord which occurs over a long period of time. One such tensioning arrangement consists of a spring in series with the cord. Another arrangement consists of an idler pulley under tension. It is an object of my invention to effect certain improvements in pulley drive arrangements of this type.

One of the features of my invention consists in using a pulley made of a resilient material, such as rubber mounted upon a driven shaft and an endless belt which is wrapped around a pulley on the driving shaft and the rubber pulley, the length of the belt being such that the rubber pulley always is slightly distorted, maintaining tension in the belt.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which the single figure illustrates a pulley drive arrangement embodying my invention.

In the single figure of the drawing there is shown a driving shaft 1 which may be journalled in any suitable bearing (not shown) and which is rotated by means of a control knob 2 and upon which is mounted a driving pulley 3. A driven shaft 4 is journalled in a bearing 5 and has mounted thereon a rubber pulley 6. Extending between the pulleys 3, 6 is an endless belt 7.

When such a drive is used, for example, to control the operation of a radio receiver, the shaft 4 may be the shaft of rotors of a plurality of the usual tuning condensers used in such a receiver, while the shaft 1 may extend from the front of the receiver cabinet and may either itself support, or include means for driving, an indicator or pointer (not shown).

In the construction of the drive pulley arrangement, the pulley 6 preferably is provided with an axial hole 8, the diameter of which is slightly less than the diameter of the shaft 4 so that, when the pulley 6 is forced on the shaft 7 as with one's fingers, it is maintained firmly in a desired position axially of the shaft. In order to increase its resilience, the pulley 6 may likewise include a plurality of transverse holes 9 arranged intermediate hole 8 and the periphery of the pulley. Preferably, in order to decrease back-lash, pulley 6 is formed from a rubber which is not too flexible and which may, for example, have a hardness of the order of 50–60 durometer.

In assembling the pulley drive arrangement, the endless belt or cord 7 is wrapped around pulley 3 at least one complete turn, as shown, and may likewise be wrapped around the rubber pulley 6 at least a full turn to obtain sufficient traction between the belt and the pulley. Preferably, the overall length of the belt is less than that required to pass freely around the pulleys 3 and 6 so that, in assembling the drive arrangement after the belt has been wrapped around the pulley 3, the pulley 6 must be deformed by compressing the holes 9 to permit wrapping the belt around this pulley. If, in this manner, the belt is made, for example, ⅜ inch too short, pulley 6 is always maintained in compression and the holes in the pulley are always deformed slightly so that, as the belt stretches due to age or climatic conditions, a lengthening of the belt by ¼ inch or more may take place before slipping occurs. In a pulley drive arrangement so constructed, I have found that, when the shaft 4 is held stationary, a very large torque is required on the control knob 2 before any slippage whatsoever occurs between the belt 7 and either of the pulleys. The cord never slips or skids on the rubber pulley and slippage on the metal pulley 3 is controlled by the number of turns of the belt around this latter pulley. While pulleys 3 and 6 are indicated as approximately of the same diameter, it is possible, of course, to change the drive ratio and direction by using pulleys of different diameter, or by twisting the belt 7.

In addition to the fact that my improved pulley drive arrangement is relatively free from slippage, the arrangement is likewise quite inexpensive and eliminates the pulley hub and set screw normally required as well as a tensioning spring for connection in series with the drive cord. Likewise, it is obvious that a very small time is required for assembling my improved pulley drive arrangement.

While I have shown and described my invention as applied to particular systems embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. A drive connection between two parallel shafts comprising a first pulley mounted upon one of said shafts, a second pulley formed substantially entirely of a resilient material mounted upon the other of said shafts, the periphery of said pulley being resiliently deformable, and an endless belt encircling said pulleys and extending between said shafts, the length of said belt being such that the body of said second pulley is distorted to maintain said belt under tension.

2. A drive connection for a pair of displaced shafts comprising a pulley, the body of said pulley being formed substantially of a resilient material, the periphery of said pulley being resiliently deformable, said pulley having an axial hole through which one of said shafts pass, means for securing said pulley firmly to said one shaft to permit rotation thereof about the axis of said one shaft, and an endless belt wrapped around the periphery of said pulley and the other of said shafts, said belt having a length such that the body of said resilient pulley is distorted to maintain said belt under tension.

3. A driving connection between a pair of shafts comprising a first pulley mounted upon one of said shafts, a rubber pulley mounted upon the other of said shafts, the periphery of said pulley being resiliently deformable, said rubber pulley having an axial hole having a diameter less than the diameter of said other shaft, and an endless belt connecting said pulleys, said belt having a length such that said rubber pulley is distorted to maintain said belt under tension.

4. A driving arrangement for a pair of shafts comprising a first pulley mounted upon one of said shafts, a rubber pulley mounted upon the other of said shafts, said rubber pulley having a plurality of transverse holes intermediate the axis and the periphery thereof, the periphery of said pulley being resiliently deformable, and an endless belt having at least one full turn around both of said pulleys and extending therebetween, said belt having a length such that said rubber pulley is maintained in compression thereby.

5. An arrangement comprising a movable drive belt, a pulley formed throughout a substantial portion of its diameter of a resilient material and mounted for movement about an axis, the periphery of said pulley being resiliently deformable, said belt engaging the peripheral surface of said pulley in driving power transfer relationship, means for insuring driving power transfer between said belt and said resilient member comprising means for applying tension to said belt sufficient to distort said pulley along said portion of said diameter, said distortion providing a restoring force to maintain said belt under tension.

6. An arrangement comprising a movable drive belt, a pulley formed throughout a substantial portion of its diameter of resilient material, the periphery of said pulley being resiliently deformable, means for mounting said pulley for rotation about the axis of a shaft passing through a hole formed in said resilient material, said belt engaging the peripheral surface of said pulley in driving power transfer relationship, means for providing transfer of driving power between said belt and said pulley comprising means for applying tension to said belt sufficient to distort said pulley along said portion of said diameter, said pulley comprising a plurality of transverse holes distributed throughout said resilient material to increase its resilience whereby said distortion provides a restoring force to maintain said belt under tension.

DONALD B. KEIM.

References Cited in the file of this patent

UNITED STATES PATENTS

| Number | Name | Date |
|---|---|---|
| 241,494 | Jarolimek | May 17, 1881 |
| 607,986 | Davy et al. | July 26, 1898 |
| 1,156,120 | Whitcomb | Oct. 12, 1915 |
| 1,217,270 | Cahill | Feb. 27, 1917 |
| 1,488,618 | Robinson | Apr. 1, 1924 |
| 1,645,552 | Tannewitz | Oct. 18, 1927 |
| 1,828,136 | Freedlander | Oct. 20, 1931 |
| 2,297,619 | Haberstump | Sept. 29, 1942 |
| 2,586,567 | Scheele | Feb. 19, 1952 |